United States Patent

[11] 3,551,704

[72] Inventors Roger D. Baum
Middletown;
David L. Favin, Little Silver, N.J.
[21] Appl. No. 716,201
[22] Filed Mar. 26, 1968
[45] Patented Dec. 29, 1970
[73] Assignee Bell Telephone Laboratories, Incorporated
Murray Hill, Berkeley Heights, N.J.
a corporation of New York

[54] PULSE GENERATOR
10 Claims, 1 Drawing Fig.

[52] U.S. Cl. .... 307/265,
307/273, 307/283, 307/301, 307/318; 331/111
331/113
[51] Int. Cl. .... H03k 1/18
[50] Field of Search .... 307/265,
273, 283; 331/111, 113

[56] References Cited
UNITED STATES PATENTS

| | | | |
|---|---|---|---|
| 3,480,801 | 11/1969 | Smith | 307/273X |
| 2,997,665 | 8/1961 | Sylvan | 307/283X |
| 3,188,623 | 6/1965 | Culbertson | 331/113X |
| 3,259,852 | 7/1966 | Todd | 331/113X |
| 3,320,440 | 5/1967 | Reed | 307/273X |
| 3,328,724 | 6/1967 | Way | 331/111X |
| 3,441,874 | 4/1969 | Bennett | 331/111 |
| 3,465,174 | 9/1969 | Soltz | 307/265X |

*Primary Examiner*—Donald D. Forrer
*Assistant Examiner*—R. C. Woodbridge
*Attorneys*—R. J. Guenther and E. W. Adams, Jr.

ABSTRACT: A unijunction transistor relaxation oscillator produces an output voltage pulse when the voltage across a charging capacitor in the oscillator reaches the predetermined voltage at which the unijunction transistor fires. A monostable multivibrator is triggered into its unstable state in response to the output voltage pulse from the relaxation oscillator and, in addition, is caused to clamp the potential across said capacitor during the unstable state to substantially zero volts, thereby preventing the capacitor from charging during the unstable state. Consequently, the period during which the monostable multivibrator is in its stable state is determined by the time constants associated with said relaxation oscillator and the period during which the monostable multivibrator is in its unstable state is determined by the timing constants associated with the monostable multivibrator. In addition, variations in the valley voltage associated with the unijunction transistor are prohibited from affecting the timing of the relaxation oscillator. The DC potential between the base electrodes of the unijunction transistor is provided from a circuit capable of providing a changeable potential in order to compensate for variations between unijunction transistors in the intrinsic standoff ratio.

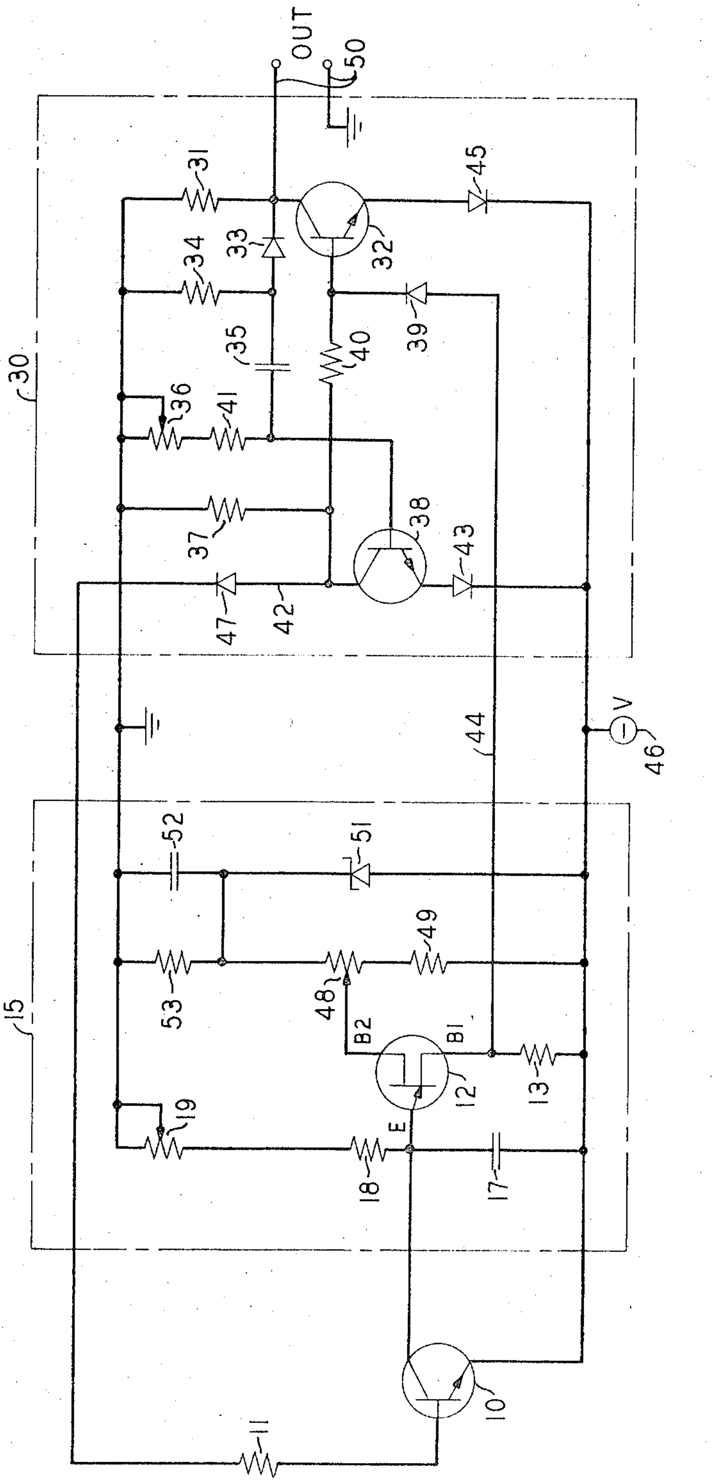
INVENTORS R. D. BAUM
D. L. FAVIN
BY Daniel D. Dubosky
ATTORNEY

PULSE GENERATOR

BACKGROUND OF THE INVENTION

This invention relates to a pulse generator and, more particularly, to a pulse generator which provides independent control of the pulse width and the time interval between pulses.

Astable multivibrators are well known in the art for providing voltage pulses having a variable duty cycle. In order to obtain a low duty cycle, however, with a free running astable multivibrator, it is necessary to have a very large difference in the time constants determining the quasistable states of the circuit. It is well known by those skilled in the art that a conventional astable multivibrator is not suitable for a highly unsymmetrical mode of operation. Special types of astable multivibrators, such as the emitter coupled multivibrators, are more suited for generating unsymmetrical waveforms. Even the specialized types, however, have difficulty in generating pulse trains having a very low duty cycle.

In FIG. 13.60 of page 344 in "The General Electric Transistor Manual," 1964, a pulse generator circuit which provides a variable frequency and duty cycle is shown utilizing a unijunction transistor oscillator in combination with a monostable type circuit. This General Electric circuit, however, in addition to not providing independent control of the pulse width interval and the time interval between output pulses, also suffers from the fact that variations in the unijunction transistor valley voltage causes variations in the performance of the circuit. Valley voltage of unijunction transistors is known to be a function of ambient conditions, such as temperature, and in addition is known to vary from one unijunction transistor to the next, even though they may be of the same type.

SUMMARY OF THE INVENTION

A primary object of the present invention is to provide an output pulse train having a variable duty cycle from a circuit which provides independent control over the pulse width interval and time interval between output pulses.

Another object of the present invention is to eliminate the effect of variations in the unijunction transistor valley voltage on the output pulse waveform.

Still another object of the present invention is to eliminate the effect of the intrinsic standoff ratio ($\eta$) of the unijunction transistor on the output voltage waveform.

These objects and other advantages are obtained in a circuit constructed in accordance with the present invention wherein a unijunction transistor relaxation oscillator is so connected in combination with a monostable multivibrator that the monostable multivibrator is triggered into operation at the instant during which the unijunction transistor relaxation oscillator produces its output pulse. During the unstable interval of the monostable multivibrator, a transistor clamp connected across the relaxation oscillator charging capacitor maintains the voltage across the charging capacitor at the saturation voltage of the clamping transistor. At the conclusion of the multivibrator unstable interval the transistor clamp is removed, and the relaxation oscillator is permitted to produce an output pulse after an interval determined by the value of the charging capacitor and charging resistor in the relaxation oscillator. A circuit capable of providing a changeable potential to the base electrodes of the unijunction transistor is also provided in order to compensate for variations between unijunction transistors in the intrinsic standoff ratio.

BRIEF DESCRIPTION OF THE DRAWING

The invention will be more readily understood when the following detailed description is read in conjunction with the attached drawing in which a schematic diagram of a circuit constructed in accordance with the present invention is shown.

DETAILED DESCRIPTION

In the drawing a circuit is shown which consists of three separate parts, a monostable multivibrator 30, a unijunction transistor oscillator 15, and a clamping circuit utilizing transistor 10. Briefly, the circuit operates as follows. With the initial application of potential from negative potential source 46 a capacitor 17 in relaxation oscillator 15 is free to charge through resistors 18 and 19 to a potential at which a unijunction transistor 12 fires, that is to say, conducts. When unijunction transistor 12 conducts, a positive pulse with respect to source 46 is produced across a resistor 13 and coupled by way of a line 44 to monostable multivibrator 30.

In response to this positive pulse, monostable multivibrator 30 is driven to its unstable state and produces a negative voltage at output terminals 50 and a potential substantially equal to ground potential on line 42. This ground potential on line 42 is coupled by way of a diode 47 and a resistor 11 to the base of a transistor 10. Since the emitter of transistor 10 is connected to negative potential source 46, appearance of ground potential on line 42 causes transistor 10 to be driven into conduction, thereby presenting a low impedance between its collector and emitter electrodes. Monostable multivibrator 30 remains in its unstable state for an interval determined by a capacitor 35 and charging resistors 36 and 41. During this unstable interval, transistor 10 remains in conduction, thereby preventing capacitor 17 from recharging to a potential at which unijunction transistor 12 will again be permitted to fire.

When monostable multivibrator 30 returns to its stable state, ground potential is again presented at output terminals 50 and transistor 10 is taken out of conduction thereby permitting capacitor 17 to recharge toward the potential at which unijunction transistor 12 will fire. Since the potential between the collector and emitter of transistor 10 when the latter is in conduction is lower than the valley voltage of transistor 12, transistor 10 clamps capacitor 17 to a substantially constant potential during each period of the cycle when transistor 10 is in conduction, and variations in the valley voltage of transistor 12 will have no effect on the operation of relaxation oscillator 15. In summary, an output voltage waveform is produced at output terminals 50 with the interval between voltage pulses controlled by the timing circuit in relaxation oscillator 15 and the pulse width interval controlled by the timing circuit in monostable multivibrator 30.

In order to practice the invention in its broadest sense circuits other than those shown in the drawing may be substituted for relaxation oscillator 15 and monostable multivibrator 30. In order to illustrate the more detailed aspects of the invention, however, each circuit shown in the drawing will be described in detail hereinafter.

Base 1 of unijunction transistor 12 in relaxation oscillator 15 is provided with a negative potential from source 46 through resistor 13. Base 2 of transistor 12 is provided with a lower negative potential from the arm of a potentiometer 48. The potential on base 2 may be changed by changing the position of the arm on potentiometer 48 which in combination with a resistor 49 provides a potential divider across a zener diode 51. Diode 51 is operated in the conventional fashion at its back-biased breakdown potential by virtue of the current which flows from ground through a resistor 53 through zener diode 51 to negative potential source 46. A capacitor 52 connected between the junction of resistor 53 and diode 51 stabilizes the DC potential provided by back-biased zener diode 51. Capacitor 17 having one plate connected to source 46 and its other plate connected to the emitter of unijunction transistor 12 is permitted to charge through resistor 18 and variable resistance 19 toward ground potential during the interval when transistor 10 is not in conduction.

As is well known to those skilled in the art, unijunction transistor 12 will fire or conduct when a predetermined potential is applied between its emitter and base 1 electrode. This predetermined potential is determined by the intrinsic standoff ratio of the unijunction transistor and the potential presented between the base 1 and base 2 electrodes. In order to compensate for a variation in the intrinsic standoff ratio which occurs from one unijunction transistor to the next, the potential supplied to the base 2 electrode by way of potentiometer 48 may be changed.

The time interval required for the potential on the emitter electrode to reach this predetermined firing potential is determined by the value of capacitor 17 and the series resistance value of resistors 18 and 19. When unijunction transistor 12 conducts, a positive current flowing from base 2 to base 1 through resistor 13 causes a voltage impulse positive with respect to source 46 to be coupled by way of line 44 to monostable multivibrator 30.

During the interval when capacitor 17 is charging monostable multivibrator 30 is in its normal or stable state. In the stable state, transistor 38 of multivibrator 30 is caused to be ON, that is to say, in conduction, by virtue of current which flows through variable resistor 36 and resistor 41 through the base emitter junction of transistor 38 through diode 43 to source 46. With transistor 38 ON the potential at the collector of transistor 38 is substantially equal to that of source 46, slightly more positive only by the potential drop occurring across transistor 38 and diode 43. During this stable state, transistor 32 whose base is connected through a resistor 40 to the collector of transistor 38 and whose emitter is connected through a diode 45 to source 46 is held OFF, that is to say, out of conduction, because the potential presented between the collector of transistor 38 and source 46 is not sufficiently positive to forward-bias the base emitter junction of transistor 32 since the latter junction is in series with diode 45. Even though this potential is inadequate to forward-bias the base emitter junction forward-bias transistor 32 even when diodes 43 and 45 are of the same type, back-bias of the junction is further insured by selecting a silicon diode for diode 45 and a germanium diode for diode 43, the latter type diode having a forward-bias potential less than that for a silicon diode.

With transistor 32 out of conduction, the potential at its collector is substantially equal to ground potential. When the above-mentioned positive impulse on line 44 from relaxation oscillator 15 is coupled through a diode 39 to the base of transistor 32, transistor 32 is driven into conduction thereby dropping the potential at its collector electrode, and therefore also the potential at output terminals 50, to a negative potential substantially equal to that provided by source 46. The sharp negative potential drop of about V volts occurring at the collector of transistor 32 is coupled through a diode 33 to one plate of a capacitor 35, the other plate of which is connected to the base of transistor 38. Since the charge on this capacitor is unable to change instantaneously, the negative potential drop of about V volts on the above-mentioned one plate causes the other plate of capacitor 35, and therefore the base of transistor 38, to be rapidly driven to a potential of about −2V volts with respect to ground. This large negative potential on the base of transistor 38 causes the latter to be taken out of conduction, thereby permitting the collector of transistor 38 to rapidly rise toward ground potential. The interval during which monostable multivibrator 30 will remain in its unstable state is determined primarily by the time constant provided by capacitor 35 and charge resistors 36 and 41. This time interval may, of course, be changed by varying the value of resistor 36.

With multivibrator potential in its unstable state, the substantially ground potential on the collector of transistor 38 is coupled by way of line 42 through diode 47 and resistor 11 to the base of transistor 10. Since the emitter of transistor 10 is connected to negative potential source 46, transistor 10 is driven into conduction during this unstable interval. With transistor 10 in conduction, capacitor 17 is discharged to a relatively low potential determined by the potential drop between the collector and emitter electrodes of transistor 10 in condition. For typical transistors, this potential is lower than any possible valley voltage of typical unijunction transistors such as transistor 12. Accordingly, even though variations in the valley voltage may occur, either due to changes in temperature or changing the unijunction transistor, capacitor 17 will begin to charge from a substantially constant potential each time that transistor 10 is permitted to return to its out of conduction state.

When multivibrator 30 returns to its stable state, the return of transistor 32 to its out of conduction state causes a sharp rise toward ground potential to appear at output terminals 50. This rise in potential is caused to occur more rapidly by virtue of the fact that capacitor 35 is returned to ground potential through its own resistor 34 and is isolated from the collector of transistor 32 by diode 33 thereby permitting the collector to return to ground potential through collector resistor 31 more rapidly than if capacitor 35 were directly connected to the collector of transistor 32.

What has been described hereinbefore is a specific illustrative embodiment of the present invention. It is to be understood that numerous other arrangements of physical parts and different components may be utilized with equal advantage. For example, other types of monostable means can be substituted for monostable multivibrator 30. In addition, the type of unijunction transistor semiconductor materials may be changed with corresponding change in the polarity of the voltage source and monostable means.

Accordingly, it is to be understood that the above described arrangement is merely illustrative of the application of the principles of the present invention and numerous modifications thereof may be devised by those skilled in the art without departing from the spirit and scope of the invention.

We claim:

1. In combination, a unijunction transistor relaxation oscillator having a capacitor the charging of which is required before the oscillator can produce an output voltage pulse, a monostable multivibrator having a stable and unstable state, means for triggering said monostable multivibrator to its unstable state in response to the output voltage pulse of said relaxation oscillator, and means for clamping the voltage across said capacitor in response to said unstable state.

2. The combination as defined in claim 1 wherein said clamping means includes a transistor with its emitter electrode connected to one plate of said capacitor and its collector electrode connected to the other plate of said capacitor.

3. The combination as defined in claim 1 wherein said relaxation oscillator includes a variable impedance connected in series with said capacitor such that changing the value of said variable impedance results in longer intervals between the start of capacitor charging and the instant at which the output voltage pulse is produced.

4. A combination as defined in claim 3 wherein the monostable multivibrator includes a means for changing the duration of the unstable state interval.

5. The combination as defined in claim 4 wherein the relaxation oscillator includes a back-biased zener diode in parallel with a potentiometer means for changing the DC potential established between the base electrodes of said unijunction transistor.

6. A pulse generator comprising a monostable multivibrator having two cross connected conductive devices having a stable state during which one of the devices is normally conducting and the other of which is normally nonconducting, a trigger input terminal coupled to the normally nonconducting device for reversing the conductive states of the devices in response to a trigger pulse, an output pulse terminal connected to the normally nonconducting device, the width of the output pulse appearing at said output terminals being equal to the interval that the normally nonconducting device is in the conducting state, a timing circuit coupled to said multivibrator including a voltage sensitive switch for generating a pulse which triggers the multivibrator into its unstable state, said timing circuit further including a capacitor-resistance charging circuit connected to said voltage sensitive switch for providing after a predetermined interval the potential at which said voltage sensitive switch conducts and generates a trigger pulse, and means for clamping the potential across the capacitor of said capacitor-resistance combination during the interval when said monostable multivibrator is in its unstable state.

7. A pulse generator as defined in claim 6 wherein said clamping means includes a transistor having its emitter electrode connected to one plate of said capacitor and its collector electrode connected to the other plate of said capacitor, and further includes means for driving said transistor into conduction when said monostable multivibrator is in its unstable state.

8. A pulse generator as defined in claim 7 wherein the resistance of said capacitor-resistance combination has a changeable value of resistance thereby permitting changes in the duration of the interval between transfer of the monostable multivibrator from its unstable to stable state and the instant during which the output voltage pulse is produced.

9. A pulse generator as defined in claim 8 wherein the monostable multivibrator includes means for changing the duration of the unstable state.

10. A pulse generator as defined in claim 9 wherein said voltage sensitive device is a unijunction transistor having two base electrodes and said timing circuit includes a back-biased zener diode in parallel with a potentiometer means for changing the DC potential established between the base electrodes of said unijunction transistor whereby the potential between said base electrodes may be changed to compensate for changes in the intrinsic standoff ratio of said unijunction transistor.